US009336113B2

(12) United States Patent
Tarr et al.

(10) Patent No.: US 9,336,113 B2
(45) Date of Patent: May 10, 2016

(54) METHOD AND DEVICE FOR SELECTING A NETWORKED MEDIA DEVICE

(71) Applicant: Bose Corporation, Framingham, MA (US)

(72) Inventors: Morton Tarr, Bolton, MA (US); Victor Berry, Ashburnham, MA (US)

(73) Assignee: Bose Corporation, Framingham, MA (US)

( * ) Notice: Subject to any disclaimer, the term of this patent is extended or adjusted under 35 U.S.C. 154(b) by 322 days.

(21) Appl. No.: 13/952,893

(22) Filed: Jul. 29, 2013

(65) Prior Publication Data

US 2015/0032844 A1    Jan. 29, 2015

(51) Int. Cl.
*G06F 11/30* (2006.01)
*H04L 29/08* (2006.01)
*H04N 21/442* (2011.01)
(Continued)

(52) U.S. Cl.
CPC ........ *G06F 11/3055* (2013.01); *H04L 12/2809* (2013.01); *H04L 67/10* (2013.01); *H04L 67/16* (2013.01); *H04N 21/44227* (2013.01);
(Continued)

(58) Field of Classification Search
CPC ........... H04L 7/00; H04L 41/00; H04L 41/06; H04L 41/0631; H04L 41/08; H04L 41/0803–41/082; H04L 41/085; H04L 41/0859; H04L 41/0876–41/0886; H04L 41/12; H04L 41/22; H04L 29/00–29/02; H04L 29/08; H04L 43/00; H04L 43/08; H04L 43/0805; H04L 43/0876; H04L 43/10; H04L 65/00; G06F 11/00; G06F 11/008; G06F 11/30; G06F 11/3055; G06F 15/00; G06F 15/16; H04N 21/20–21/218; H04N 21/27–21/2747; H04N 21/40–21/4104; H04N 21/4108; H04N 21/4113; H04N 21/4126; H04N 21/414; H04N 21/43; H04N 21/433; H04N 21/436; H04N 21/437; H04N 21/441; H04N 21/442; H04N 21/44213–21/44222; H04N 21/44231
See application file for complete search history.

(56) References Cited

U.S. PATENT DOCUMENTS 5,835,721 A * 11/1998 Donahue et al. ............... 709/224
6,934,269 B1 * 8/2005 Hasha et al. .................. 370/312
(Continued)

FOREIGN PATENT DOCUMENTS

EP    1768031 A1    3/2007
WO    2006066052 A2    6/2006

OTHER PUBLICATIONS

The International Search Report and the Written Opinion of the International Searching Authority mailed on Sep. 25, 2014 for corresponding PCT Application No. PCT/US2014/048092.

*Primary Examiner* — Brian J Gillis
*Assistant Examiner* — Boris Grijalva Lobos
(74) *Attorney, Agent, or Firm* — Brian M. Dingman; Dingman IP Law, PC

(57) ABSTRACT

A method and device for selecting a media device that is enabled to receive and then play or distribute digital media files, where the media device is or has been connected to a network over which the digital media is delivered to the media device. Media devices that have been connected to the network are identified. Identification information for available media devices that are currently connected to the network and turned on, and identification information for unavailable media devices that are not currently turned on or are not currently connected to the network, is stored. A selection of either an available or an unavailable media device is received, and in response the digital media is distributed over the network to the selected media device.

17 Claims, 4 Drawing Sheets

(51) Int. Cl.
*H04L 12/28* (2006.01)
*H04N 21/41* (2011.01)

(52) U.S. Cl.
CPC .. *H04N21/44231* (2013.01); *H04L 2012/2849* (2013.01); *H04N 21/4108* (2013.01)

(56) References Cited

U.S. PATENT DOCUMENTS

| | | | |
|---|---|---|---|
| 7,058,681 B1* | 6/2006 | Uno et al. | 709/203 |
| 7,139,981 B2* | 11/2006 | Mayer et al. | 715/771 |
| 7,177,929 B2 | 2/2007 | Burbeck et al. | |
| 7,234,115 B1* | 6/2007 | Sprauve et al. | 715/746 |
| 7,428,592 B2 | 9/2008 | Lee et al. | |
| 7,535,890 B2 | 5/2009 | Rojas | |
| 7,889,678 B2* | 2/2011 | Peterson | 370/254 |
| 7,925,729 B2* | 4/2011 | Bush et al. | 709/223 |
| 7,974,217 B2* | 7/2011 | Park et al. | 370/254 |
| 8,005,236 B2* | 8/2011 | Igoe | 381/81 |
| 8,307,388 B2* | 11/2012 | Igoe et al. | 725/11 |
| 8,391,857 B2 | 3/2013 | Catalano et al. | |
| 8,406,252 B1* | 3/2013 | Wuthnow et al. | 370/466 |
| 8,436,943 B2* | 5/2013 | Cooper et al. | 348/705 |
| 8,704,777 B2* | 4/2014 | Small et al. | 345/173 |
| 8,711,866 B2* | 4/2014 | Shmueli et al. | 370/396 |
| 8,766,795 B1* | 7/2014 | Causey | G08B 1/08 340/3.7 |
| 8,837,898 B2* | 9/2014 | Davidson et al. | 386/201 |
| 8,949,910 B2* | 2/2015 | Meredith et al. | 725/80 |
| 9,037,683 B1* | 5/2015 | Yoden | H04L 65/4084 709/219 |
| 2003/0014436 A1* | 1/2003 | Spencer et al. | 707/501.1 |
| 2003/0075983 A1* | 4/2003 | Stecyk et al. | 307/38 |
| 2003/0103075 A1* | 6/2003 | Rosselot | 345/717 |
| 2003/0200371 A1* | 10/2003 | Abujbara | 710/305 |
| 2005/0117910 A1* | 6/2005 | Foote et al. | 398/106 |
| 2006/0165064 A1 | 7/2006 | Brown et al. | |
| 2006/0200599 A1* | 9/2006 | Manchester | G06F 17/30194 710/62 |
| 2007/0078948 A1* | 4/2007 | Julia et al. | 709/217 |
| 2007/0239880 A1* | 10/2007 | Alperin et al. | 709/230 |
| 2009/0210484 A1* | 8/2009 | Schneider | 709/203 |
| 2009/0319700 A1* | 12/2009 | Cohn et al. | 710/19 |
| 2010/0057576 A1* | 3/2010 | Brodersen | G06Q 30/0273 705/14.69 |
| 2011/0126104 A1* | 5/2011 | Woods et al. | 715/719 |
| 2011/0211532 A1* | 9/2011 | Hargrave et al. | 370/328 |
| 2012/0030328 A1 | 2/2012 | Jiang | |
| 2012/0151357 A1* | 6/2012 | Roche et al. | 715/736 |
| 2013/0106686 A1* | 5/2013 | Bennett | 345/156 |
| 2014/0059635 A1* | 2/2014 | Sirpal | H04N 5/44 725/131 |
| 2014/0136667 A1* | 5/2014 | Gonsalves | G06F 11/3664 709/221 |
| 2015/0062621 A1* | 3/2015 | Xiao | 358/1.15 |
| 2015/0189390 A1* | 7/2015 | Sirpal | H04N 21/4858 725/51 |

* cited by examiner

METHOD AND DEVICE FOR SELECTING A NETWORKED MEDIA DEVICE

BACKGROUND

This disclosure relates to media device networks.

Media devices are adapted to play and/or distribute digital music, image or audio/visual (A/V) data files. Non-limiting examples include wireless loudspeakers and computers. Media devices are often connected to a network such as a LAN in a home or an enterprise. In order to play media to a networked media device, the user must select the media device from a menu using the source device or a separate device that distributes media, such as a digital media receiver. The source then streams the files to the selected media device. However, if the media device that the user desires to select is not connected to the network and/or is not powered on (i.e., the media device is unavailable on the network), the media device will not appear on the device selection menu. In order to play media to a media device that is connected to the network but not powered on, the user must first turn on the device, and only then will the device be available in the selection menu so it can be chosen. This is inconvenient.

More generally, a typical home or enterprise network consists of multiple devices in communication with each other. Devices are available to be connected to other devices on the network only when they are connected and powered. A device is unavailable to the network if it is either disconnected or unpowered, becoming invisible to other devices within the network.

SUMMARY

There are instances when it might be useful to have the ability to select a networked media device even though the device is unavailable (i.e., it is not connected to the network and/or is not powered on). For example, the user may want to be able to select an unavailable device so that it plays streamed media once it is connected to the network and turned on. If the user were able to target the presently unavailable device within the network, and the system behaved as if it was streaming data to the selected device, then when the selected device became available on the network it could immediately begin receiving the streamed data. This would provide convenience for the user as the target device may be at a remote location. Requiring network availability for the device before being able to select it may be inconvenient for the user, especially with contemporary wireless technologies.

The method and device for selecting a networked media device that is disclosed herein allows a media device to be selected to be used to play digital media files even if the device is currently not available on the network (i.e., even if it is powered off and/or not connected to the network). This result is accomplished by maintaining a persistent memory that includes an identification of and the network location of all media devices that are currently available on the network (i.e., powered on and connected to the network) as well as media devices that have been available on the network but are currently unavailable. This persistent memory is typically used to generate a drop-down menu from which a user can make a selection of a media device to which media files are to be streamed. When a device is unavailable (i.e., it is powered off and/or not connected to the network), media cannot be streamed to it. The system can behave as if it is streaming media to the device, and engage the device once it becomes available at the current point in the stream. The system could also delay the start of the stream until the device is available. This timing aspect can be user selectable, or it can be determined by other means. For example, if a single currently unavailable device is selected, the stream can be delayed so it starts when the device is available.

All examples and features mentioned below can be combined in any technically possible way.

In one aspect, a method for selecting a media device that is enabled to receive and then play or distribute digital media files, where the media device is or has been connected to a network over which the digital media is to be delivered, includes the steps of identifying media devices that have been connected to the network, storing identification information for available media devices that are currently connected to the network and turned on, and also storing identification information for unavailable media devices that are not currently turned on and/or are not currently connected to the network, receiving a selection of either an available or an unavailable media device, and in response to receiving a selection of either an available or an unavailable media device, providing for the distribution of digital media over the network to the selected media device.

Embodiments may include one of the following features, or any combination thereof. Media devices that have been connected to the network may be identified by the media devices that are available on the network reporting their presence on the network. The stored identification information may include the MAC address and the IP address of the media device, and may further include information concerning the functionality of the media device. Storing media device identification information may comprise including the identifying information in a persistent database. The method may then further comprise removing from the database media device identifying information if the media device has not been available on the network for a predetermined period of time.

Embodiments may include one of the following additional features, or any combination thereof. Distributing digital media over the network to the selected media device may comprise communicating at least some of the stored identification information to a source of digital media. The distribution of digital media to the selected media device can begin only when the selected device becomes available on the network. The method may further comprise, in response to receiving a selection of either an available or an unavailable media device, determining whether the selected media device is compatible with the digital media that is to be distributed to the selected media device. The method may further comprise communicating incompatibility if the selected media device is incompatible with the digital media that is to be distributed to the selected media device. The selection of either an available or an unavailable media device may be received based on a user's selection. The storing, receiving and distribution steps may be accomplished with a network appliance that is persistently available on the network.

Another aspect includes a computer device that is configured to select a media device to receive and then play or distribute digital media files, where the media device is or has been connected to a network over which the digital media is to be delivered, and where the computer device is available on the network. The computer device includes a memory. The computer device also has a processor that is communicatively coupled to the memory and that is configured to identify media devices that have been connected to the network. The processor also directs the storage in the memory of identification information for available media devices that are currently connected to the network and turned on and identification information for unavailable media devices that are not currently turned on and/or are not currently connected to the network. The processor receives a selection of either an available or an unavailable media device, and in response to receiving a selection of either an available or an unavailable media device, the processor provides for the distribution of the digital media over the network to the selected media device.

Embodiments may include one of the following features, or any combination thereof. The media devices that have been connected to the network may be identified by periodically receiving information about available media devices on the network. The identifying information may comprise the MAC address and the IP address and the functionality of the media device. The media device identification information may be stored in a persistent database in the memory. The processor may be further configured to remove from the database media device identifying information if the media device has not been available on the network for a predetermined period of time, or for other reasons. The processor may be further configured, in response to receiving a selection of either an available or an unavailable media device, to determine whether the selected media device is compatible with the digital media that is to be distributed to the selected media device and communicate incompatibility if the selected media device is incompatible with the digital media that is to be distributed to the selected media device.

Another aspect includes a network appliance that is configured to allow the selection of a media device that is enabled to receive and then play or distribute digital media files, where the media device is or has been connected to a network over which the digital media is to be delivered, and where the network appliance is available on the network. The network appliance includes a persistent memory, and a processor communicatively coupled to the memory and that is configured to identify media devices that have been connected to the network. Media devices that have been connected to the network are identified by the media devices that are available on the network reporting their presence on the network, and the processor receiving identifying information for such available media devices. The received identifying information comprises the MAC address of the media device, the IP address of the media device, and information concerning the functionality of the media device. The identification information for available media devices that are currently connected to the network and turned on, and also identification information for unavailable media devices that are not currently turned on and/or are not currently connected to the network, is stored in the memory. The media device identifying information can be automatically removed from the database; the removal can be based on reasons such as if the media device has not been available on the network for a predetermined period of time, or for other reasons. A selection of either an available or an unavailable media device is received from a user. In response to receiving a selection of either an available or an unavailable media device, the processor determines whether the selected media device is compatible with the digital media that is to be distributed to the selected media device and communicates incompatibility if the selected media device is incompatible with the digital media that is to be distributed to the selected media device. The digital media is distributed over the network to the selected media device, which involves communicating at least some of the stored identification information to a source of digital media. The actual distribution of digital media to the selected media device begins only when the selected device becomes available on the network.

DETAILED DESCRIPTION

The innovation contemplates a method for selecting a media device that is enabled to receive and then play or distribute digital media files. The media device is or has been connected to a network over which the digital media is to be delivered. In the method, media devices that have been connected to the network are identified. Identification information for available media devices that are currently connected to the network and turned on, as well as for unavailable media devices that are not currently turned on and/or are not currently connected to the network, is stored in a persistent memory. Thereafter, a selection of either an available or an unavailable media device is received. In response, digital media is delivered over the network to the selected media device once the selected media device is available on the network. Also contemplated is a computer device (such as a network appliance) that is configured to be involved in the subject method.

Figure 1:
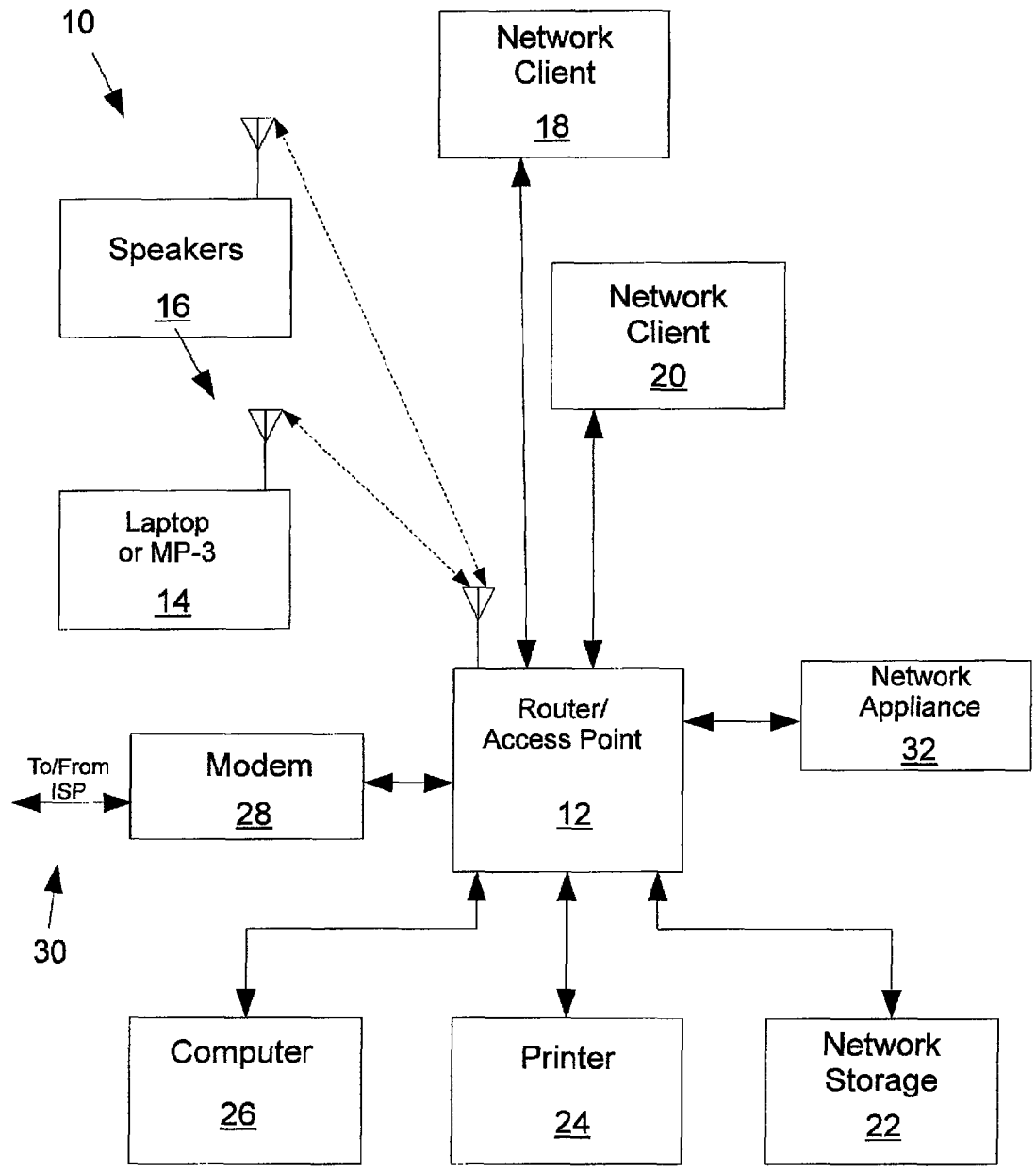
FIG. 1 is block diagram of a home or office network that can embody a method and device for selecting a networked media device.

FIG. 1 shows a typical in-home or office network 10 in which a router or other access point 12 provides several points of contact through which various network devices or clients such as a laptop or MP-3 player 14, speakers 16, various other devices 18, 20, a data storage device 22, a printer 24, or a computer 26, just to name a few examples, may transmit and receive data. The devices communicate through the router with wired or wireless connections throughout the network. Modem 28 connects the network to the internet service provider (ISP) 30. The router communicates with the network devices by means known in the networking field, such as by one or both of the device's IP and MAC addresses. This allows the router to maintain a specific address for each specific network device. The router is able to send and receive information from each device once it is available on the network, thereby making itself present within the network with its individual IP and MAC addresses. However, the router will not know a device is available within the network unless it is powered. Due to the mobility of devices throughout one's home and property, there are times when one would like to select devices, through which to communicate information, when they are unavailable to the network, perhaps to be available shortly. The network appliance 32 provides a persistent memory of network device address and identity information, allowing other (aware) media devices, via the router, to see the network devices as present, therefore permitting the selection of these devices, even while they are actually unavailable to the network. Data is then streamed to a selected device once the device becomes available on the network.

Figure 2:
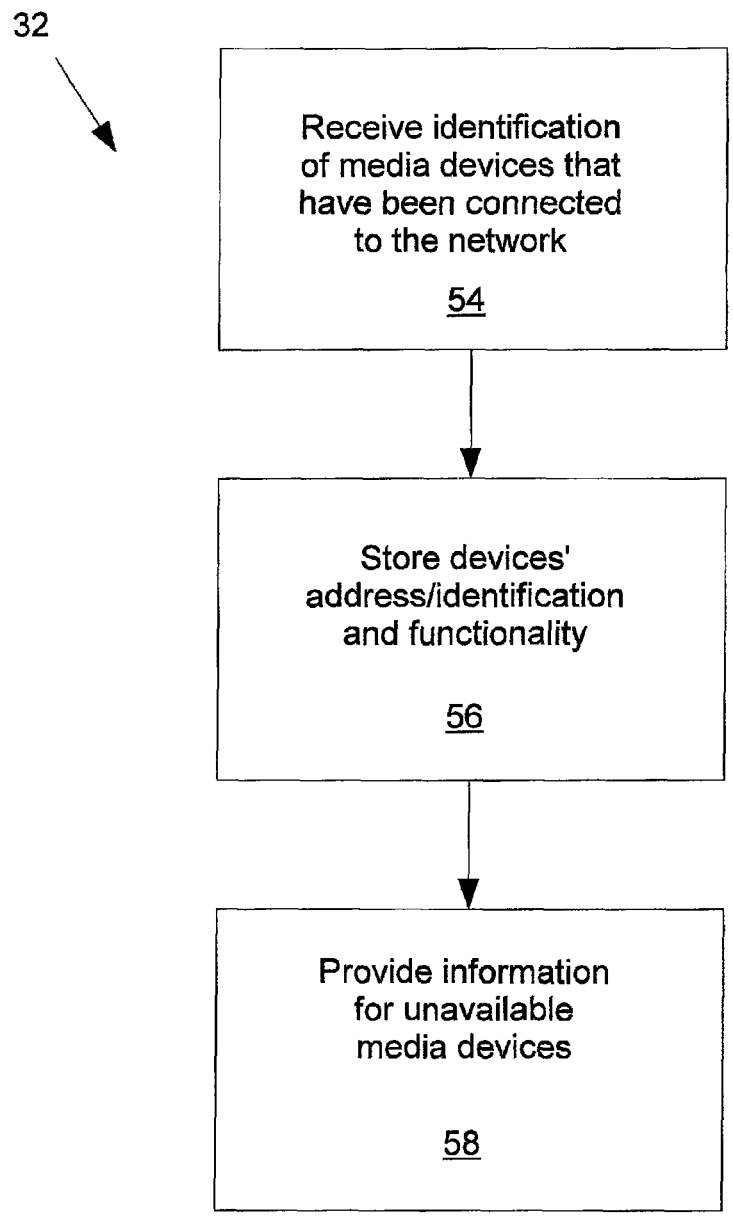
FIG. 2 is a block diagram of the functionality of one example of a network appliance.

FIG. 2 is a block diagram of some of the relevant functionality of one example of network appliance 32. Once a media device is connected to the network and powered, the now-available media device reports its presence on the network, step 54. The report would include information identifying the device, its address, and its functionality. Any other device on the network that includes the functionality of a network appliance (e.g., another media device, a computer, a portable computing device, or a dedicated device with a processor and a memory) would receive the report and log the information to its database, step 56. There would typically only need to be one network appliance on the network. In order to make its database persistently available, the network appliance is typically always powered and is hard wired into the network. If more than one network appliance is on the network, each network appliance would synchronize with other network appliances so that all of the network appliances include a database of media devices that are or have been active on the network. This way, each network appliance is able to be involved in the process of allowing a user to select a media device which is not currently active on the network. A network appliance is now able to provide information to any other networked media device concerning any device in the network appliance database, including devices which have been active on the network but are currently unavailable (e.g., because they have been powered off and/or disconnected from the network), step 58. The user may at any time delete information from the network appliance database, for example in order to remove addresses of devices which are no longer used within the network. Also, the network appliance may be configured to automatically remove a device from its database if the device has not been active for a predetermined amount of time, under the assumption that the device is no longer used on the network.

Figure 3:
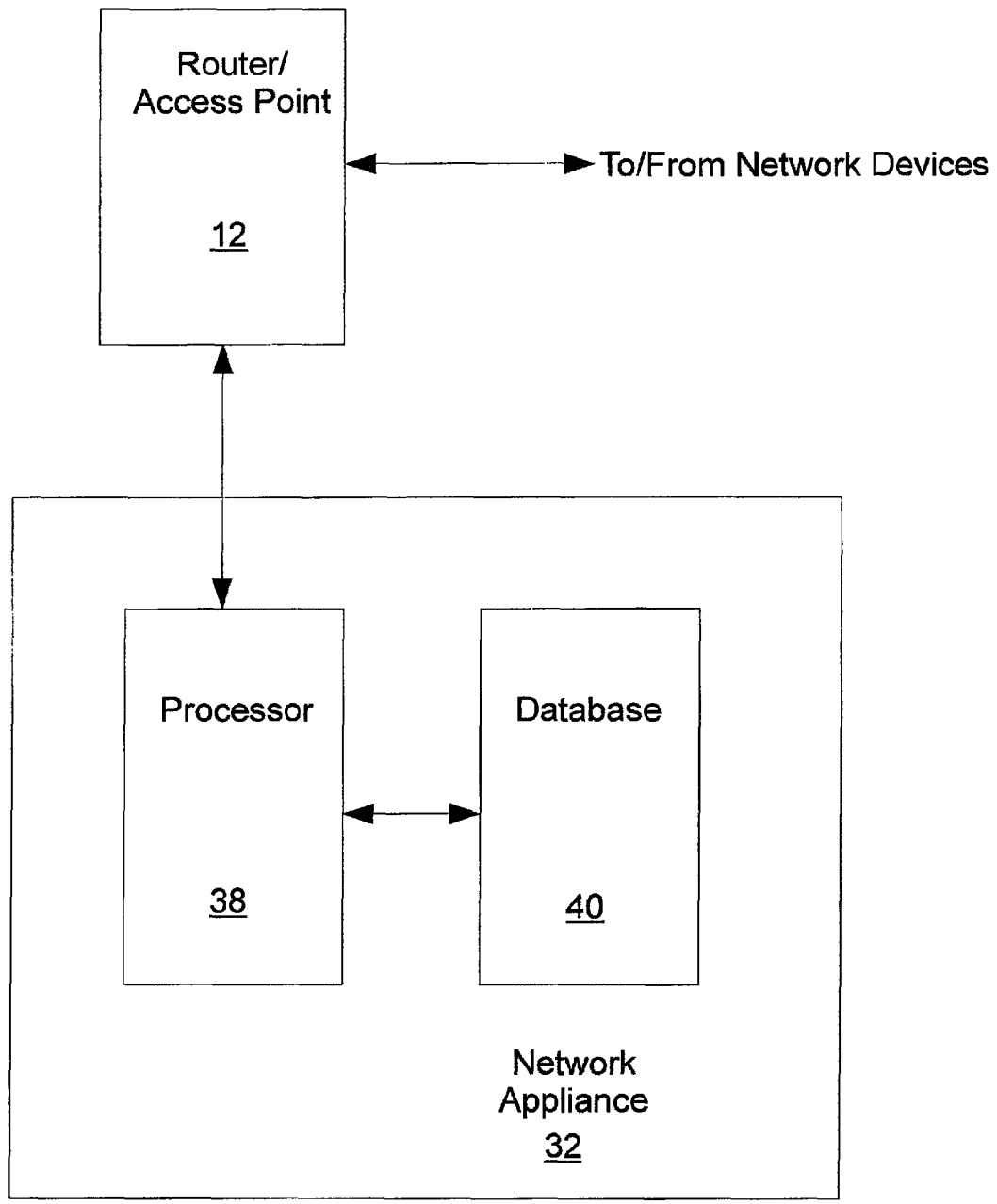
FIG. 3 illustrates communication between a network router and a network appliance.

FIG. 3 shows the communication between the network router 12 and the network appliance 32. The network appliance processor 38 receives via router 12 address/identity and functionality information from a media device when the subject media device is connected to the network; the media device would report this information to the network each time the media device was connected to the network and powered on. The information is stored in the network appliance database 40. Database 40 is maintained as part of the network and is persistent, i.e., the network appliance is always powered, and the database is maintained in non-volatile memory. Accordingly, when a media device is unavailable to the network the identity of the media device is still available via database 40. A user can thus select an unavailable media device by accessing the network appliance database. This allows a user to select a media device even though communication cannot be immediately established since the selected device is unavailable to the network. The network appliance can query each device when it appears on the network (via a standard protocol for this type of query), or at such time as it is updated, as to the capabilities embodied in the device. In addition to the IP address and MAC address of each device, the network appliance will store the name of the device, the capabilities of the device (e.g., the kinds of data files or streams it can play), and optionally, revision level of the hardware and software, and location within the office or home. The network appliance may store other data about each device as well.

A user can thus select a media device to receive data files regardless of whether the media device is currently available to play or distribute the data. When a media device is unavailable to the network the network appliance represents it to the network; this allows the media device to be selected to receive data as if it was in fact active on the network. When the user navigates on the user's device to the menu of media devices, because of the network appliance database the menu includes all of the media devices, regardless of whether they are currently active (available) on the network.

When a media device is unavailable (i.e., it is powered off and/or not connected to the network), media cannot be streamed to it. When an unavailable media device is selected to receive streamed data, the system can behave as if it is streaming media to the device, and then engage the device once it becomes available. The data can be presented at the current point in the stream. Alternatively, the system could also delay the start of the stream until the device is available so that the entire stream is played by the device. This timing of the playing of the stream can be user selectable, or determined by other means. For example, if there is a single device and that device is selected, the stream can be delayed so it starts when the device is available. On the other hand if there are several devices playing the stream and one is being added, most likely the added device would pick up the stream at the point where it was being played to the other devices. When the selected media device becomes available on the network the selected media device queries the network for data that is addressed for it. A network appliance will respond to the query with the identification of the device that is streaming data to the selected media device. The streaming device and the selected media device are then able to establish a communications path. If by chance the selected media device is incompatible with the digital media that is to be distributed to it, the network appliance can communicate the incompatibility. This communication would likely take the form of an error message sent to the device that was used to make the selection.

Figure 4:
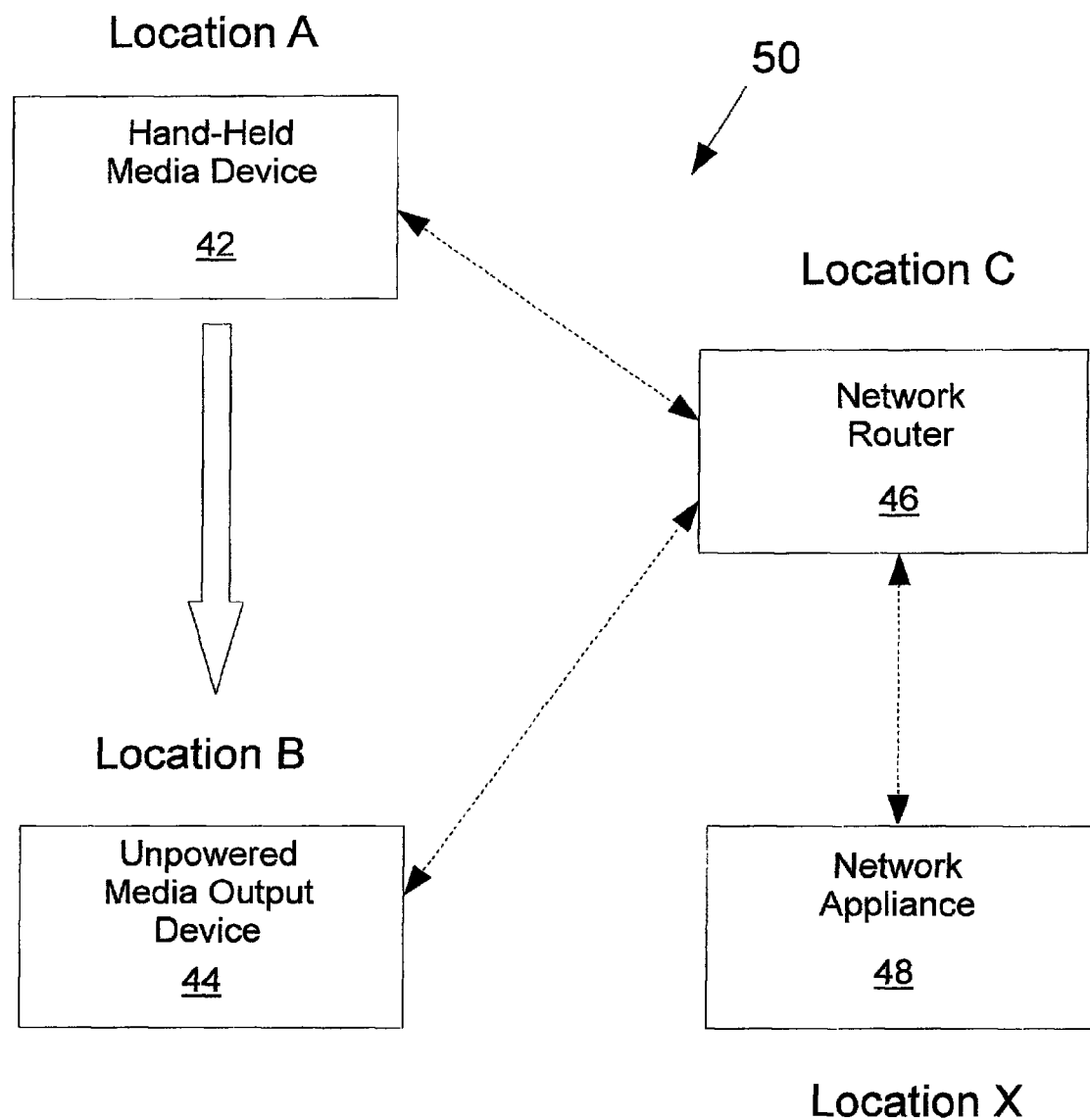
FIG. 4 is a block diagram that illustrates a process through which a user may utilize a network appliance while using a typical in-home or office network.

A specific, non-limiting example of a process through which a user may utilize a network appliance 48 while using a typical in-home or office network 50 is illustrated in FIG. 4. The user may wish to play music from a hand-held device 42 such as a mobile phone or MP3 player that is in Location A. Also, the user may wish to play the music through a media output device 44 that is in Location B, such as wireless speaker system for example, which does not reside near the router 46 in Location C, the place from which device connection occurs. The network appliance 48, located anywhere within wired or wireless connection to the router, allows selection of the wireless speaker system from the hand-held device, even though the wireless speaker system may be unavailable to the network at the time of selection. This would allow the user to remain remote from the other network devices while a media output device is selected, enjoying the device performance when the user arrives at, and powers or connects (makes available) the selected device.

Alternate embodiments of the invention are contemplated. In FIG. 1, as described above, the network appliance 32 may be a distinct hardware device within the network 10, much like other devices or clients 12, 14 16, 18, 20, 22, 24, 26 in communication with each other. However, the network appliance may be in the form of software, resident within the firmware of one or more of the network devices or clients within the network. This latter embodiment of the network appliance would utilize the two-way communication among the network devices and the router 12. The network devices, functioning also as network appliances, would monitor the network and gather and store the IP and MAC address and functionality information as described above, eliminating the need for the distinct hardware network appliance device 32 which is depicted in FIG. 1.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for selecting a media device that is enabled to receive and then play or distribute digital media files, where the media device is or has been connected to a network over which the digital media is to be delivered to the media device, the method comprising:
   identifying media devices that have been connected to the network;
   storing identification information for available media devices that are currently connected to the network and turned on, and also storing identification information for unavailable media devices, wherein unavailable media devices are media devices that have been connected to the network but are not currently turned on or are not currently connected to the network;
   receiving a selection of either an available or an unavailable media device; and
   in response to receiving a selection of either an available or an unavailable media device, determining whether the selected media device is compatible with the digital media that is to be distributed to the selected media device;
   in response to receiving a selection of an available media device, providing for the distribution of digital media over the network to the selected available media device;
   in response to receiving a selection of an unavailable media device, providing for the distribution of digital media over the network to the selected unavailable media device;
   wherein providing for the distribution of digital media over the network to the selected media device comprises communicating at least some of the stored identification information to a source of digital media
   wherein the selection of either an available or an unavailable media device is received based on a user's selection.

2. The method of claim 1 wherein media devices that have been connected to the network are identified by the media devices reporting their presence on the network.

3. The method of claim 2 wherein the stored identification information comprises the MAC address and the IP address of the media device.

4. The method of claim 3 wherein the stored identification information further comprises information concerning the functionality of the media device.

5. The method of claim 2 wherein storing media device identification information comprises including the identifying information in a persistent database.

6. The method of claim 5 further comprising automatically removing from the database media device identifying information if the media device has not been available on the network for a predetermined period of time.

7. The method of claim 1 wherein the distribution of digital media to the selected media device begins only when the selected device becomes available on the network.

8. The method of claim 1 further comprising communicating incompatibility if the selected media device is incompatible with the digital media that is to be distributed to the selected media device.

9. The method of claim 1 wherein the storing, receiving and distributing steps are accomplished using a network appliance that is persistently available on the network.

10. A computer device configured for selecting a media device to receive and then play or distribute digital media files, where the media device is or has been connected to a network over which the digital media is to be delivered to the media device, and where the computer device is operably connected to the network, the computer device comprising:
    a memory; and
    a processor communicatively coupled to the memory and that is configured to:
       identify media devices that have been connected to the network;
       direct the storage in the memory of identification information for available media devices that are currently connected to the network and turned on, and also identification information for unavailable media devices that are not currently turned on or are not currently connected to the network;
       receive a selection of either an available or an unavailable media device; and
       in response to receiving a selection of either an available or an unavailable media device, determine whether the selected media device is compatible with the digital media that is to be distributed to the selected media device;
       in response to receiving a selection of an available media device, provide for the distribution of digital media over the network to the selected available media device, and
       in response to receiving a selection of an unavailable media device, providing for the distribution of digital media over the network to the selected unavailable media device;
       wherein providing, for the distribution of digital media over the network to the selected media device comprises communicating at least some of the stored identification information to a source of digital media.

11. The computer device of claim 10 wherein media devices that have been connected to the network are identified by periodically receiving information about available media devices on the network.

12. The computer device of claim 11 wherein the identifying information comprises the MAC address and the IP address and the functionality of the media device.

13. The computer device of claim 11 wherein the media device identification information is stored in a persistent database in the memory.

14. The computer device of claim 13 wherein the processor is further configured to automatically remove from the database media device identifying information if the media device has not been available on the network for a predetermined period of time.

15. The computer device of claim 10 wherein the processor is further configured to communicate incompatibility if the selected media device is incompatible with the digital media that is to be distributed to the selected media device.

16. A network appliance that is configured to allow the selection of a media device that is enabled to receive and then play or distribute digital media files, where the media device is or has been connected to a network over which the digital media is to be delivered to the media device, and where the network appliance is available on the network, the network appliance comprising:
   a persistent memory; and
   a processor communicatively coupled to the memory and that is configured to:
      identify media devices that have been connected to the network, wherein media devices that have been connected to the network are identified by periodically querying available media devices on the network and retrieving identifying information for such available media devices, wherein the retrieved identifying information comprises the MAC address of the media device, the IP address of the media device, and information concerning the functionality of the media device;
      direct the storage in the memory of identification information for available media devices that are currently connected to the network and turned on, and also identification information for unavailable media devices that are not currently turned on or are not currently connected to the network;
      remove from the database media device identifying information if the media device has not been available on the network for a predetermined period of time;
      receive from a user a selection of either an available or an unavailable media device; and
      in response to receiving a selection of an available media device, determine whether the selected available media device is compatible with the digital media that is to be distributed to the selected available media device and communicate incompatibility if the selected available media device is incompatible with the digital media that is to be distributed to the selected available media device, and provide for the distribution of digital media over the network to the selected available media device, which includes communicating at least some of the stored identification information to a source of digital media,
      in response to receiving a selection of an unavailable media device, determine whether the selected unavailable media device is compatible with the digital media that is to be distributed to the selected unavailable media device and communicate incompatibility if the selected unavailable media device is incompatible with the digital media that is to be distributed to the selected unavailable media device, and provide for the distribution of digital media over the network to the selected unavailable media device, which includes communicating at least some of the stored identification information to a source of digital media, wherein the distribution of digital media to the selected unavailable media device begins only when the selected unavailable media device becomes available on the network.

17. A method for selecting a media device that is enabled to receive and then play or distribute digital media files, where the media device is or has been connected to a network over which the digital media is to be delivered to the media device, the method comprising:
   identifying media devices that have been connected to the network;
   storing identification information for available media devices that are currently connected to the network and turned on, and also storing identification information for unavailable media devices, wherein unavailable media devices are media device that have been connected to the network but are not currently turned on or are not currently connected to the network;
   receiving a selection of an available media device, wherein the selection of the available media device is received based on a user's selection;
   receiving a selection of an unavailable media device, wherein the selection of the unavailable media device is received based on a user's selection;
   initiating streaming of a digital media file to the selected available media device,
   providing the streaming digital media file to a representation of the unavailable media device as if the unavailable device were available, and;
   in response to the unavailable media device becoming available, presenting the streaming digital media file to the selected unavailable media device that has become available at the current point in the stream.

\* \* \* \* \*